April 6, 1937.  C. E. REED  2,075,997
ROLLER CUTTER, SPINDLE AND BEARING ASSEMBLY FOR EARTH BORING DRILLS
Filed June 25, 1935
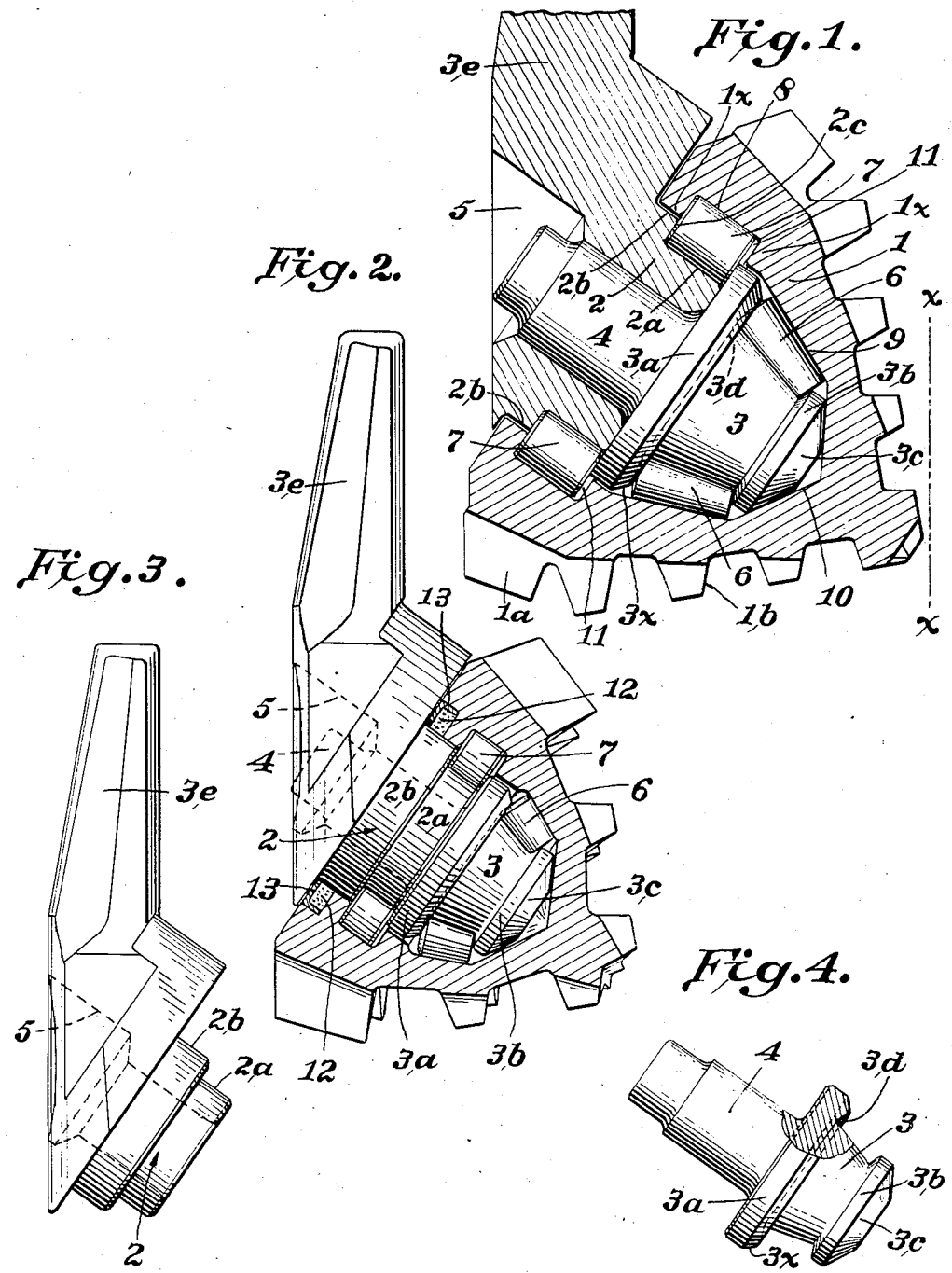
INVENTOR:
Clarence E. Reed,
BY
ATTORNEYS.

Patented Apr. 6, 1937

2,075,997

UNITED STATES PATENT OFFICE 2,075,997

ROLLER CUTTER, SPINDLE AND BEARING ASSEMBLY FOR EARTH BORING DRILLS

Clarence E. Reed, Wichita, Kans., assignor to Chicago Pneumatic Tool Company, New York, N. Y., a corporation of New Jersey Application June 25, 1935, Serial No. 28,329

15 Claims. (Cl. 255—71)

One object of the invention is to provide an anti-friction bearing and spindle assembly for roller cutters of earth boring drills which will sustain thrusts radially of the axis of the cutter, and also end thrusts outwardly of the cutter towards the spindle support at the base of the cutter, the rollers which sustain the main loads radially relative to the cutter axis being employed to hold the roller cutter rotatively in place.

Another object of the invention is to provide means whereby the bearing portions of the assembly may be supplied with lubricant.

In the drawing,

Figure 1 is a central vertical sectional view of the cutter, the main part of the spindle, and its support, with parts in elevation.

Fig. 2 is a view of another form of invention showing a packing ring for holding lubricating material within the assembly, the cutter being shown in section, and the spindle and anti-friction devices being shown in elevation.

Figure 3 is a side view of the main spindle section and its support.

Fig. 4 is a side view, partly in section, of the terminal portion of the sectional spindle.

Referring to Figure 1, the roller cutter 1 is of frusto-conical form, having a toothed base cutting zone 1a and a toothed frusto-conical cutting zone 1b. These two zones are at an inclination to each other. The teeth of the base zone are comparatively wide and extend in planes radially from the axis of the cutter. The teeth of the frusto-conical zone are arranged in widely spaced apart circumferential rows. The cutter is in one piece.

The spindle comprises a main portion 2 and a terminal portion 3. The main portion is integrally connected with its base or support, which has a shank 3e extending upwardly to fit into a recess in the bit head, wherein it is suitably secured, as, for instance, by welding. The terminal portion of the spindle is composed of the body portion 3, of frusto-conical form, tapering towards the apex end of the rotary cutter, a circumferential flange 3a at the base of and of larger diameter than said body portion, a flange 3b at the apex portion of said body, and a beveled end 3c beyond the flange 3b towards the apex end of the roller cutter.

The terminal portion of the spindle has a stem 4 of cylindrical form extending from the base flange 3a through a bore in the main part 2 of the spindle, and having a reduced diameter end located in a recess 5 of the spindle support, wherein said reduced diameter end is welded in place to hold the terminal part of the spindle in place with the face of the base flange 3a fitting against the end face of the main spindle portion 2. The flange 3a has a beveled outer face 3x. The main part 3 of the terminal spindle section provides a raceway bounded by the spaced apart flanges 3a and 3b upon which the anti-friction rollers 6 are adapted to run, said rollers being of frusto-conical form with their larger base ends adjacent the flange 3a. These larger diameter or base ends of these frusto-conical anti-friction rollers bear upon the flange 3a at the larger diameter or base end of the frusto-conical body portion 3 of the terminal section of the spindle, and for receiving the large ends of these anti-friction rollers, the face of the flange is undercut at 3d, as indicated in dotted lines.

The base or large diameter end face of the anti-friction rollers is slightly convexed to conform to the configuration of the bottom wall of the undercut or groove 3d, so that these conical rollers get a substantial bearing of their end faces upon the wall of the undercut, or groove, or raceway, in the face of said flange 3a. The main portion 2 of the spindle at its end is of reduced diameter, as indicated at 2a, in respect to its portion 2b adjacent the spindle support, and this end is of cylindrical form and provides the bottom of a raceway for anti-friction rollers 7. The face of the flange 3a of the terminal section of the spindle forms one side of this raceway, and the shoulder 2c formed by the face of the main spindle portion 2b of full diameter forms the other side wall of this runway. The flange 3a is of larger diameter than the main portion 2 of the spindle, and of the body of the terminal section of this spindle, and thus provides one defining wall of each of the raceways for the anti-friction rollers 6 as well as for the anti-friction rollers 7.

The frusto-conical cutter has a bore conforming generally to the configuration of the spindle and anti-friction members above described. That is to say, it has a bore tapering generally towards the free end of the spindle which it encloses, said bore being made up of a large diameter cylindrical portion 1x within the base of the cutter having a groove 8 in its wall substantially complementary to the raceway of the spindle formed by the surface 2a, and the faces of the flange 3a, and of the shoulder 2b, said cutter raceway receiving the rollers 7; next, a frusto-conical bore portion 9 complementary to the surface of the frusto-conical body 3 of the terminal section of the spindle, thereby providing a raceway portion for the frusto-conical rollers 6, and next, and finally in order, towards the free end of the assembly the bore of the cutter has a conical bore, the wall 10 of which is complementary to the conical free end face of the terminal section of the spindle for frictional engagement therewith.

In assembling the organization, the terminal section of the spindle is placed first in the roller cutter with its free end resting upon the wall 10 of the bore of the cutter, it being understood that the frusto-conical rollers 6 must first have been placed in the raceway defined by the walls 3, 3a, 3b, so that the terminal section of the spindle carrying these anti-friction rollers properly seated therein are placed in position as one body. Next the rollers 7 are placed in the raceway of the cutter. This readily can be done, because the annular space between the stem 4 and the wall of the cutter bore is of sufficient width to allow the rollers 7 to be moved first endwise in this space, and then laterally into the raceway portion 8. The main section of the spindle is now moved axially along the stem 4 into the position shown in the drawing, and then the projecting end of the stem is welded in the recess 5.

The vertical axis of the drill is indicated by the dotted line x—x. The turning of the bit head carries the organization about this vertical axis causing the frusto-conical cutter to roll upon the bottom of the bore hole in the position indicated in the drawing, so that the teeth will cut the formation, and the form of the cut will be substantially that of the general outline of the toothed surfaces of the cutter as illustrated. The thrusts upon the cutter are upward and outward in respect to the vertical axis of the drill. End thrusts of the cutter outwardly from the drill axis towards the spindle support are taken by the contacting friction surfaces between the free end of the spindle and the wall of the bore of the cutter within its apex; also by the conical anti-friction rollers, these end thrusts of the said rollers being transmitted into the conical body portion 3 of the terminal spindle section, the flange 3a, and thence to the main spindle section, and its support. Up thrusts will also be sustained by the surfaces and anti-friction rollers, and thrusts imposed in a direction radial to the axis of the cutter will also be sustained by the frusto-conical rollers and in part substantially by the beveled free end of the terminal section of the spindle. Upthrusts and thrusts imposed radially of the axis of the roller cutter will be sustained by the cylindrical rollers.

End thrust of the cutter outwardly towards the spindle support will not be imposed on these cylindrical rollers because of the space 11 between the wall of the raceway and the end face of the roller, which space will prevent these rollers from being in shear relation to the roller cutters. These rollers will take some of the upthrust imposed on the roller cutters, and particularly the radial thrusts, from the cutting zone 1a.

These rollers will lock the roller cutter on the spindle rotatively.

In Fig. 2, I show an organization similar to the above, but provided with a packing ring at 12 whereby grease packed in the bore of the cutter for lubrication will be maintained in place. This packing or sealing ring may be composed of soft rubber, or other yielding material, held by a metal ring 13, preferably of spring steel. This ring is L-shape in cross section. It is split with its ends cut square across, but slightly spaced apart.

This sealing ring is located in a counterbore in the end of the cutter at its base, and this counterbore communicates with the bore of the cutter, so that the sealing ring 12 can bear on the spindle adjacent its base and make a sealing joint therewith to prevent the escape of the lubricant with which the assembly is packed. The steel ring of L-shape in cross section has its base flange near the face of the spindle support.

The sealing ring would be compressed when placed in position. The spring steel ring would expand against the cutter wall and would rotate with the cutter, while the sealing ring itself would tend to remain substantially in fixed relation to the spindle.

The sealing ring may be used with the form shown in Fig. 1 as well as in Fig. 2.

It will be noted from Fig. 2 that the wall of the cutter bore at the base portion of the cutter is in frictional bearing contact with the spindle.

The flange within the base bore of the cutter has frictional bearing on the spindle.

I claim:

1. In combination in a roller cutter, spindle and bearing assembly for earth boring drills, a spindle comprising a main section, a support therefor and a terminal section having a body portion of frusto-conical form with an annular flange at the base end thereof larger in diameter than said body portion, said body portion terminating at its smaller end in an annular flange having a beveled end face, said spindle sections having a raceway between them of which the said annular flange at the base of the body of the terminal section forms a side wall, frusto-conical anti-friction rollers on the tapered body portion of the terminal section, means for fastening the terminal spindle section to the main spindle section, rolling anti-friction bearings in the raceway between the spindle sections, and a toothed rotary cutter having a bore receiving the spindle and enclosing its free end, the wall of the cutter bore having raceways for the frusto-conical rollers and the rolling bearings, substantially as described.

2. An assembly according to claim 1 in which the said rolling bearings are in the form of cylindrical rollers, substantially as described.

3. An assembly according to claim 1 in which the bottom of the raceway in the spindle for the rolling bearings is in the form of a cylindrical reduced diameter extension of the main spindle section.

4. As an article of manufacture, a spindle and support for an earth boring drill comprising a spindle body with a raceway thereon for receiving radial thrusts of a roller cutter transmitted through rolling bearings and an end thrust bearing including an annular friction bearing surface and a tapered raceway for roller bearings, the tapered raceway having shoulders for abutting the ends of the tapered roller bearings, with one of said shoulders for receiving the larger diameter end of the tapered rollers being undercut in respect to a plane perpendicular to the spindle axis.

5. In combination in a roller cutter, spindle and bearing for an earth boring drill, a spindle formed in main and terminal sections axially in alignment and secured together, roller bearings located between the main section of the spindle and the wall of the cutter bore to rotatively lock the cutter on the spindle, the terminal section of the spindle having an annular flange and an annular thrust friction bearing surface engaged by a complementary bearing surface in the cutter, which cutter encloses the spindle, said spindle including a tapered bearing area and tapered roller bearings engaging said tapered bearing area of the spindle, and said cutter having a complementary tapered bearing area for the tapered roller bearings, the smaller diameter ends of said tapered roller bearings abutting the flange on the terminal section.

6. In combination in a roller cutter spindle and bearing assembly for an earth boring drill and in combination, a spindle made up of a main section and a terminal section, secured together, said spindle having a tapered roller bearing raceway, a frusto conical cutter enclosing the free end of the spindle and having in the cutter bore an annular friction bearing surface complementary to an annular bearing surface on the terminal section of said spindle, tapered roller bearings on the tapered raceway between said cutter and said spindle, a flange on said terminal section projecting beyond said raceway and between an end of said tapered roller bearings and the closed end of the cutter bore.

7. In a roller boring drill, a roller cutter unit comprising a spindle composed of a main section and a terminal section, a frusto conical cutter enclosing the free end of the spindle, said unit having complementary, annular frictional bearing surfaces in the cutter bore and on the terminal section of the spindle, tapered roller bearings in a raceway between the cutter and the spindle, said roller bearings abutting a shoulder on said spindle, and a flange on said terminal section of said spindle positioned between the inner ends of the tapered roller bearings and the closed end of the cutter bore.

8. In a roller cutter unit for an earth boring drill, and in combination, a spindle having an annular friction bearing surface, an approximately frusto-conical cutter having an annular frictional bearing surface in the cutter bore complementary to the annular frictional bearing surface on the spindle, tapered roller bearings positioned in a raceway between the cutter and the spindle, shoulders on the spindle defining the width of said raceway and one of said shoulders extending from said raceway substantially the same distance as the diameter of one end of said tapered roller bearings and the other shoulder extending about half of the diameter of the other end of said roller bearings.

9. In a roller cutter unit for an earth boring drill, and in combination, a spindle having a tapered roller bearing surface and adjacent its base having another roller bearing surface, roller bearings on said last mentioned surface, an approximately frusto conical roller cutter having a base cutting zone inclined to a frusto conical cutting zone thereon and said cutter having an integral flange adjacent its base overlapping the end of said roller bearings, tapered roller bearings between the cutter bore and the tapered bearing surface of the spindle, said spindle having a flange thereon at its smaller diameter free end located between the inner end faces of the tapered roller bearings and the closed end of the bore in the cutter.

10. As an article of manufacture, a spindle and support for an earth boring drill comprising a spindle body having a cylindrical bearing surface and a tapered bearing surface with a flange between said surfaces, another flange on said spindle adjacent the free end thereof, and an annular surface on said spindle adapted for frictional contact with a complementary surface in a roller cutter bore.

11. A roller cutter and bearing assembly for earth boring drills comprising a spindle support, a spindle body projecting from said support and composed of a main section and a removable terminal section attached to the main section, said terminal section having a frusto-conical raceway defined by a flange at the small diameter end of said frusto-conical raceway and a flange at the larger diameter portion of said raceway, said latter flange abutting the end of the main spindle section and being of larger diameter than said end, said main section having a cylindrical raceway adjacent said last mentioned flange, a frusto-conical roller cutter having therein raceways complementary to the raceways on the spindle, frusto-conical roller bearings on the complementary frusto-conical raceways of the spindle and cutter, and having their end faces contacting the flanges of the terminal spindle section, and cylindrical roller bearings between the complementary raceways of the cutter and spindle, said cylindrical roller bearing engaging the larger diameter spindle flange to lock the cutter rotatively on the spindle while taking radial loads, the said frusto-conical roller bearings taking both radial loads imposed on the rotary cutter and also end thrust of said cutter towards the spindle support.

12. As an article of manufacture, a spindle and support for an earth boring drill comprising a spindle projecting from the support with one end free, said spindle having adjacent the support a cylindrical raceway for receiving radial thrusts of the roller cutter transmitted through cylindrical roller bearings, said spindle having at a zone between the cylindrical raceway and the free end a separately-formed frusto-conical raceway for roller bearings with a shoulder at each side of said frusto-conical raceway positioning said roller bearings for sustaining on their peripheries end thrust of the roller cutter outwardly towards the support.

13. A roller cutter and bearing assembly for earth boring drills comprising a spindle support, a spindle projecting therefrom having a free end, said spindle having a frusto-conical raceway tapered towards the free end of the spindle and defined at its larger diameter end by an annular shoulder, said spindle also having a cylindrical raceway positioned between said annular shoulder of the frusto-conical raceway and the support, a frusto-conical roller cutter embracing the free end of the spindle and having a bore, the wall of which near the apex portion of the cutter has a frusto-conical raceway complementary to the frusto-conical raceway of the spindle, and having in the base portion of said bore a cylindrical raceway complementary to the cylindrical raceway on the spindle, cylindrical roller bearings between the cylindrical raceways of the spindle and wall of the cutter bore adjacent the bases of said parts, and frusto-conical rollers between the complementary frusto-conical raceways of the spindle and cutter, having their larger diameter end faces engaging said annular shoulder, said cylindrical roller bearings taking loads imposed on the cutter radially thereof, and said frusto-conical rollers taking loads imposed thereon both radially and endwise of the roller cutter towards the spindle support, said frusto-conical raceway having a flange at its smaller end with which the small diameter end faces of the frusto-conical roller bearings engage, substantially as described.

14. A roller cutter and bearing assembly for earth boring drills comprising a spindle support, a spindle projecting therefrom having a free end, said spindle having a frusto-conical raceway tapered towards the free end of the spindle and defined at its larger diameter end by an annular shoulder, said spindle also having a cylindrical raceway positioned between said annular shoulder of the frusto-conical raceway and the support, a frusto-conical roller cutter embracing the free end of the spindle and having a bore, the wall of which near the apex portion of the cutter has a frusto-conical raceway complementary to the frusto-conical raceway of the spindle, and having in the base portion of said bore a cylindrical raceway complementary to the cylindrical raceway on the spindle, cylindrical roller bearings between the cylindrical raceways of the spindle and wall of the cutter bore adjacent the bases of said parts, and frusto-conical rollers between the complementary frusto-conical raceways of the spindle and cutter, having their larger diameter end faces engaging said annular shoulder, said cylindrical roller bearings taking loads imposed on the cutter radially thereof, and said frusto-conical rollers taking loads imposed thereon both radially and endwise of the roller cutter towards the spindle support, said annular shoulder being furnished by a flange with which the cylindrical roller bearings engage, the free end of the spindle being removable from the main section thereof, which main section carries said cylindrical raceway, said flange together with a terminal flange on said removable section defining the length of the frusto-conical raceway, substantially as described.

15. A roller cutter and bearing assembly for earth boring drills comprising a support, a spindle projecting from said support having a cylindrical portion near the support and a frusto-conical portion at its free end, a frusto-conical cutter having a bore with surfaces complementary to the cylindrical and frusto-conical portions of the spindle, said spindle having an annular shoulder at the larger end of its frusto-conical portion, cylindrical rollers between the complementary cylindrical surfaces of the spindle and cutter arranged on axes parallel with the axes of the spindle and cutter, and taking radial loads of the cutter, and frusto-conical rollers between the complementary frusto-conical surfaces of the spindle and cutter, with their larger end faces engaging said shoulder on the spindle, said frusto-conical rollers taking radial loads and also end thrust of the roller cutter outwardly towards the spindle support, substantially as described.

CLARENCE E. REED.